(12) United States Patent
Yu et al.

(10) Patent No.: US 9,001,812 B2
(45) Date of Patent: Apr. 7, 2015

(54) TIMING ERROR ESTIMATE OF UL SYNCHRONIZATION

(71) Applicant: Nokia Siemens Networks Oy, Espoo (FI)

(72) Inventors: Xiaoyong Yu, Grayslake, IL (US); Shirish Nagaraj, Hoffman Estates, IL (US); Ke-Kang Chin, Bartlett, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 61 days.

(21) Appl. No.: 13/719,385

(22) Filed: Dec. 19, 2012

(65) Prior Publication Data

US 2014/0169280 A1 Jun. 19, 2014

(51) Int. Cl.
*H04J 1/00* (2006.01)
*H04W 72/08* (2009.01)
*H04L 27/26* (2006.01)

(52) U.S. Cl.
CPC ......... *H04W 72/082* (2013.01); *H04L 27/2662* (2013.01); *H04L 27/2675* (2013.01)

(58) Field of Classification Search
USPC .......................... 370/203–208, 329–342, 350
See application file for complete search history.

(56) References Cited

U.S. PATENT DOCUMENTS

| | | | | |
|---|---|---|---|---|
| 5,548,613 | A * | 8/1996 | Kaku et al. | 375/150 |
| 6,438,362 | B1 * | 8/2002 | Amezawa | 455/226.3 |
| 6,798,736 | B1 * | 9/2004 | Black et al. | 370/208 |

OTHER PUBLICATIONS

Kim, D. et al.; "A New Joint Algorithm of Symbol Timing Recovery and Sampling Clock Adjustment for OFDM Systems"; IEEE Transactions on Consumer Electronics, vol. 44, No. 3; Aug. 1998; pp. 1142-1149.

* cited by examiner

*Primary Examiner* — Kan Yuen
(74) *Attorney, Agent, or Firm* — Harrington & Smith

(57) ABSTRACT

The specification and drawings present a new method, apparatus and software related product (e.g., a computer readable memory) for a timing offset/error estimate (TOE) method, e.g., for a LTE UL receiver. This may especially beneficial for the MU-MIMO and/or CoMP with MAAS applications, where the conventional methods do not work properly due to a strong interference among users (UEs) sharing the same radio resource. Two approaches (separately or in combination) may be used to improve TOE quality. First, the timing offset/error may be calculated using phase difference for pilot pairs with non-adjacent pilots/carriers having a larger separation between subcarriers than for pilot pairs with adjacent subcarriers. Second, a modified pilot sequence for timing offset estimate may be created using sliding an averaging window. This can effectively remove interference which is critical for the MU-MIMO and CoMP applications.

19 Claims, 8 Drawing Sheets

TIMING ERROR ESTIMATE OF UL SYNCHRONIZATION

TECHNICAL FIELD

The exemplary and non-limiting embodiments of this invention relate generally to wireless communications and more specifically to a timing error estimate method, e.g., for a LTE UL receiver, especially for MU-MIMO and/or CoMP with MAAS.

BACKGROUND ART

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:
3GPP third generation partnership project
AWGN additive white Gaussian noise
CoMP coordinated multiple point
CP cyclical prefix
DFT discrete Fourier transform
DL downlink
DMRS demodulate reference signal;
DRAN density radio access network;
DS data symbol
DSP digital signal processor
E-UTRA evolved universal terrestrial radio access
eNB or eNodeB evolved node B/base station in an E-UTRAN system
E-UTRAN evolved UTRAN (LTE)
FFT fast Fourier transform
FO frequency offset
LTE long term evolution
LTE-A long term evolution advanced
MAAS multiple antenna aperture system
MIMO multiple input multiple output
MU-MEMO multiple-user multiple input multiple output
OFDM orthogonal frequency division multiplexing
PUSCH physical uplink shared channel
RB resource block
RS reference symbol
SC-FDMA single carrier frequency division multiplexing access
SNR signal to noise ratio
TO timing offset
TOE timing offset estimate
UE user equipment (e.g. mobile terminal)
UL uplink
UTRAN universal terrestrial radio access network In LTE system, timing synchronization between UE and eNB depends on the timing offset estimate of UL receiver in the eNB, where timing error of each UE is estimated and an associated adjustment command may be sent from the eNB to the UE. Therefore the timing error estimate quality directly affects the synchronization between the UE and eNB, which ultimately affects system performance. Conventional methods for timing error estimate can work in normal operation where received desired user signal power dominates. However, in case of UL MU-MIMO and/or CoMP with MAAS, the conventional methods may not work properly any more due to strong interference among users assigned the same radio resource. It has been observed in tests for CoMP with MAAS that the UE and eNB can no longer keep synchronization in time, so that the communication between the UE and eNB may be disconnected due to a timing error estimate in the UL receiver.

SUMMARY

According to a first embodiment of the invention, a method, comprising: demodulating a group of pilots received uplink in a network element from a user equipment served by the network element to provide a group of demodulated pilots, each pilot corresponding to one frequency subcarrier of a plurality of frequency subcarriers; and sliding in the network element an averaging window through the demodulated pilots of the group of the demodulated pilots to determine a modified group of demodulated pilots having a removed interference component caused by other user equipments using predetermined rules, the averaging window having a length comprising multiple pilots.

According to a second embodiment of the invention, an apparatus comprising: at least one processor and a memory storing a set of computer instructions, in which the processor and the memory storing the computer instructions are configured to cause the apparatus to: demodulate a group of pilots received uplink by the apparatus from a user equipment served by the network element to provide a group of demodulated pilots, each pilot corresponding to one frequency subcarrier of a plurality of frequency subcarriers; and slide an averaging window through the demodulated pilots of the group of the demodulated pilots to determine a modified group of demodulated pilots having a removed interference component caused by other user equipments using predetermined rules, the averaging window having a length comprising multiple pilots.

According to a third embodiment of the invention, a computer program product comprising a non-transitory computer readable medium bearing computer program code embodied herein for use with a computer, the computer program code comprising: code for demodulating a group of pilots received uplink in a network element from a user equipment served by the network element to provide a group of demodulated pilots, each pilot corresponding to one frequency subcarrier of a plurality of frequency subcarriers; and code for sliding in the network element an averaging window through the demodulated pilots of the group of the demodulated pilots to determine a modified group of demodulated pilots having a removed interference component caused by other user equipments using According to a fourth embodiment of the invention, a method, comprising: demodulating a group of pilots received uplink in a network element from a user equipment served by the network element to provide a group of demodulated pilots, each pilot corresponding to one frequency subcarrier of a plurality of frequency subcarriers; and calculating in the network element timing offsets in the group of demodulated pilots or in a modified group of demodulated pilots using phase differences for pairs of the demodulated pilots comprised in the group of demodulated pilots or in the modified group of demodulated pilots, the demodulated pilots in the pairs being separated by two or more frequency subcarriers of the plurality of frequency subcarriers.

According to a fifth embodiment of the invention, an apparatus comprising: at least one processor and a memory storing a set of computer instructions, in which the processor and the memory storing the computer instructions are configured to cause the apparatus to: demodulate a group of pilots received uplink in the apparatus from a user equipment served by the network element to provide a group of demodulated pilots, each pilot corresponding to one frequency subcarrier of a plurality of frequency subcarriers; and calculate timing offsets in the group of demodulated pilots or in a modified group of demodulated pilots using phase differences for pairs of the demodulated pilots comprised in the group of demodulated pilots or in the modified group of demodulated pilots, the demodulated pilots in the pairs being separated by two or more frequency subcarriers of the plurality of frequency subcarriers.

According to a sixth embodiment of the invention, a computer program product comprising a non-transitory computer readable medium bearing computer program code embodied herein for use with a computer, the computer program code comprising: code for demodulating a group of pilots received uplink in a network element from a user equipment served by the network element to provide a group of demodulated pilots, each pilot corresponding to one frequency subcarrier of a plurality of frequency subcarriers; and code for calculating in the network element timing offsets in the group of demodulated pilots or in a modified group of demodulated pilots using phase differences for pairs of the demodulated pilots comprised in the group of demodulated pilots or in the modified group of demodulated pilots, the demodulated pilots in the pairs being separated by two or more frequency subcarriers of the plurality of frequency subcarriers.

BRIEF DESCRIPTION OF THE DRAWINGS

For a better understanding of the nature and objects of the present invention, reference is made to the following detailed description taken in conjunction with the following drawings, in which:

FIGS. 6a-6b show TOE simulation results (TO samples vs. desired user SNR) for a second embodiment of the invention;

DETAILED DESCRIPTION

Figure 1:
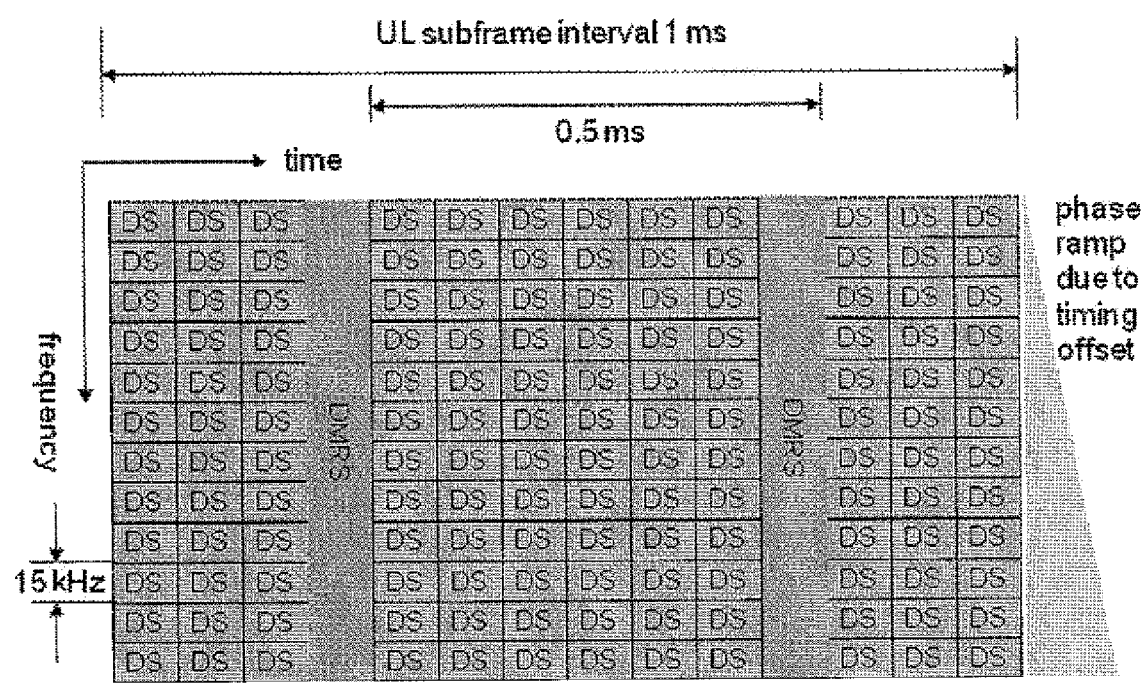
FIG. 1 is a diagram depicting a time-frequency domain LTE UL signal structure for PUSCH in the UE transmitter.

In LTE system, the timing synchronization between UE and serving eNB is achieved by timing error estimate conducted in the eNB UL receiver and associated adjustment commands are sent from the eNB to the UE. Therefore the timing error estimate quality directly affects the synchronization between the UE and eNB, which ultimately affects system performance.

It is known that timing error in OFDM system only causes received frequency domain signal phase rotation that depends on a subcarrier index, given the timing error magnitude is within a CP interval. Conventionally, the timing offset estimate may be calculated based on a phase difference of demodulated pilot (or RS) pairs between adjacent subcarriers. This method may not work in the presence of a strong interference among users and can result in detachment of the UE from the serving eNB.

A new method, apparatus, and software related product (e.g., a computer readable memory) are presented for a timing error estimate method, e.g., for a LTE UL receiver. The embodiments described herein may be especially beneficial for the MU-MIMO and/or CoMP with MAAS applications, where the conventional methods do not work properly due to a strong interference among users (UEs) sharing the same radio resource. It is critical to make UL MU-MIMO and CoMP work and keep UEs synchronized with eNBs. Two approaches (separately or in combination) may be used to improve timing offset estimate quality. First, the timing offset/error may be calculated using phase difference for pilot pairs with non-adjacent pilots/carriers having a larger separation between subcarriers than for pilot pairs with adjacent subcarriers. This can effectively reduce noise power and result in a better performance in all cases of interest. Second, a modified pilot sequence for timing offset estimate may be created using sliding window average (or sliding an averaging window). This can effectively remove interference which is critical for the MU-MIMO and CoMP applications. The embodiments described herein can be applied to any OFDM system where there is a need to calculate timing offset estimate.

For example, according to a first embodiment, a network element (e.g., eNB) may receive from a UE in UL and demodulate a group of pilots to provide a group of demodulated pilots, each pilot corresponding to one frequency subcarrier of a plurality of frequency subcarriers.

After demodulating, the network element can calculate timing offsets/errors in the demodulated group of pilots or in a modified group of demodulated pilots (as described further herein) using phase differences for pairs of the demodulated pilots comprised in the group of demodulated pilots or in the modified group of demodulated pilots, the demodulated pilots in the pairs being separated by two or more (e.g., 5, 6 or 7) frequency subcarriers of the plurality of frequency subcarriers. Then an average timing offset can be calculated by averaging over the calculated timing offsets when the pairs being separated by two or more frequency subcarriers, which could be followed by signaling, by the network element (eNB) to the UE, an adjustment command based at least on the calculated average timing offset.

It is further shown herein that a noise component in the timing offset calculated using phase differences for pairs of the demodulated pilots is inversely proportional a lag equals to a number of the two or more frequency subcarriers separating pilots in the pairs of the demodulated pilots.

According to a second embodiment, first (like in the first embodiment), the network element (e.g., eNB) may receive from a UE in UL and demodulate a group of pilots to provide a group of demodulated pilots, each pilot corresponding to one frequency subcarrier of a plurality of frequency subcarriers.

Then, however, before calculate timing offsets/errors, the network element (eNB) can perform sliding an averaging window (based on coordinated pilot orthogonality) through demodulated pilots of the group of the demodulated pilots to determine a modified group of demodulated pilots having a removed interference component caused by other UEs using predetermined rules, the averaging window having a length comprising multiple pilots (e.g., six or twelve pilots).

It is noted that for this embodiment the network element (eNB) may be engaged in a MU MIMO operation and/or in a CoMP operation where the UE can share at least one common radio resource with other UEs served by the network element/eNB, so that the other UEs may create the interference component in the demodulated pilots which is removed using the sliding of the averaging window. The modified group of demodulated pilots will comprise less pilots than the group of demodulated pilots by a number of pilots having a total length equals to the length of the averaging window.

Creation of the modified group of demodulated pilots may be followed by the calculation of the timing offsets/errors for this modified demodulated group of pilots (with removed interference component) using phase differences for pairs of the demodulated pilots comprised in the modified group of demodulated pilots, where the demodulated pilots in corresponding pairs may be separated by one or more frequency subcarriers of the plurality of frequency subcarriers (i.e., having lag of one or more) as further explained herein. In the following further explanations pertinent to embodiments described herein are provided.

In order to understand the impact of timing offset on the received LTE UL signal, let us review some DFT (discrete Fourier transform) properties. Let $x_l$ and $X_k$ be a time domain signal and an associated frequency domain signal respectively, where $k,l=0, 1, 2, \ldots, N-1$ represent time domain sample and frequency domain subcarrier index respectively, and N is a system DFT size. When the time domain signal $x_l$ is cyclically shifted by $\tau$ samples (where $x_l$ is periodical signal with the period N), the frequency domain signal is given by:

$$DFT(x_{l-\tau})|_k = \frac{1}{\sqrt{N}} \sum_{l=0}^{N-1} x_{l-\tau} e^{-j\frac{2\pi}{N}kl} \qquad (1)$$

$$= \frac{1}{\sqrt{N}} \sum_{m=-\tau}^{N-1-\tau} x_m e^{-j\frac{2\pi}{N}k(m+\tau)}$$

$$= e^{-j\frac{2\pi}{N}\tau k} \frac{1}{\sqrt{N}} \sum_{m=0}^{N-1} x_m e^{-j\frac{2\pi}{N}km}$$

$$= e^{-j\frac{2\pi}{N}\tau k} DFT(x_m)$$

$$= e^{-j\frac{2\pi}{N}\tau k} X_k.$$

This implies that the impact of timing offset on LTE UL signal is a pure frequency domain phase rotation or a subcarrier dependent phase rotation, given the timing offset is within a CP (Cyclic Prefix) interval. Therefore, a TOE (timing offset estimate) can be calculated based on the received pilots or DMRS (demodulation reference signal).

FIG. 1 depicts a frequency domain LTE UL signal structure for PUSCH (physical uplink shared channel) at mobile (UE) transmitter, where one RB (resource block) pair within one subframe (of 1 ms) is illustrated. Each RB consists of 12 subcarriers (15 MHz each) in a frequency domain and seven SC-FDMA (single carrier frequency division multiplexing access) symbols in a time domain and partitioned into DSs (data symbols) and pilots. DMRS or pilots (as known to both transmitter and receiver) are located in the middle of the RB in the time domain. In other words, the middle SC-FDMA symbol in the RB is a DMRS that occupies all subcarriers used by the mobile user (UE) for the PUSCH. As shown above, any TO (timing offset) will cause received frequency domain DMRS phase rotation or phase ramp across subcarriers as illustrated in FIG. 1. Consequently, the TOE can be calculated based on the phase ramp of received DMRS or pilots.

The LTE UL timing offset estimate for a single UE according to the first embodiment described herein can be calculated as follows. In a conventional approach, the TOE at the UL receiver can be based on the phase difference of demodulated pilots of adjacent subcarriers. Let $R_k$ be a frequency domain received pilot on subcarrier k. Without loss of generality, in case of timing offset $\tau$ samples with an AWGN (additive white Gaussian noise), $R_k$ can be represented as follows:

$$R_k = c_k e^{-j\frac{2\pi}{N}\tau k} + n \qquad (2)$$

$$k = 0, 1, 2, \ldots, N_{sc}-1,$$

where $c_k$ is a pilot sequence on kth subcarrier, which is known to the UL receiver (e.g., in the eNB); n is the AWGN and $N_{sc}$ is a number of subcarriers of the UE used for the PUSCH (N is a system DFT size). A demodulated pilot $P_k$ may be obtained by multiplying $R_k$ by a conjugated pilot sequence, resulting (since $c_k c^*_k = 1$) as follows:

$$P_k = R_k c_k^* = e^{-j\frac{2\pi}{N}\tau k} + n', \qquad (3)$$

$$k = 0, 1, 2, \ldots, N_{sc}-1$$

where $n'=c^*n$. Therefore, the TOE based on adjacent subcarrier phase difference may be calculated as $$\hat{\tau}_1 = \frac{N}{2\pi}(\angle P_{k-1} - \angle P_k) \qquad (4)$$

$$= \frac{N}{2\pi}\angle(P_{k-1}P_k^*)$$

$$= \frac{N}{2\pi}(\angle e^{j\frac{2\pi}{N}\tau} + n'')$$

$$= \tau + \frac{N}{2\pi}n''$$

$$= \tau + \tilde{n},$$

where n″ is a modified AWGN term. Then a final TOE value may be determined as an average of all $\hat{\tau}_1$ of adjacent pilot pairs.

Figure 2:
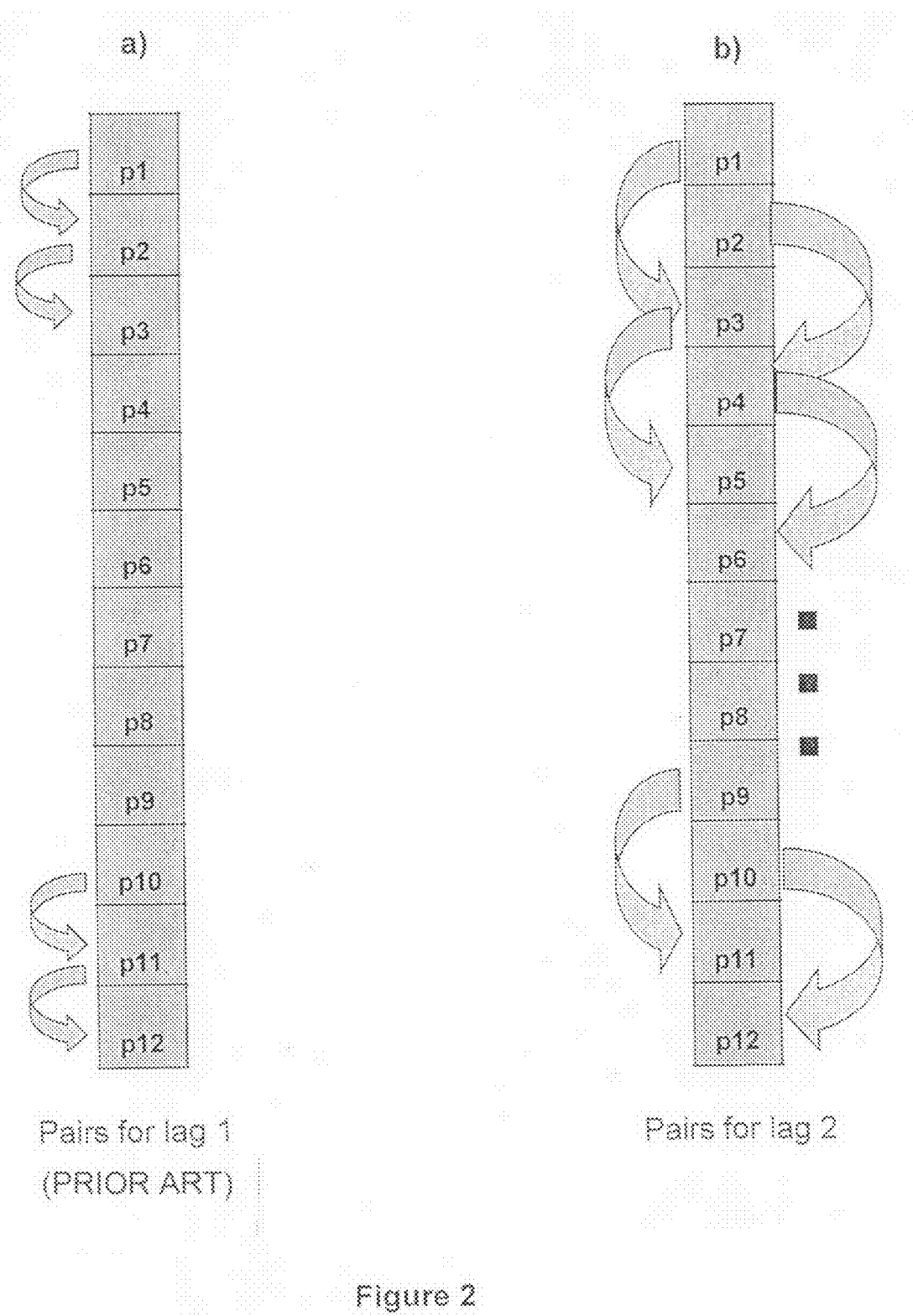
FIGS. 2a-2b are diagrams demonstrating pilot pairs which may be user for a TOE using adjacent pilot pairs with lag 1 for a conventional approach (FIG. 2a) and using pilot pairs with larger separation, e.g., separated by 2 subcarriers with lag 2 (FIG. 2b) according to an exemplary embodiment of the invention.

Furthermore, according to the first embodiment described herein, in order to improve TOE performance, especially in case of low SNR (signal to noise ratio), the phase difference can be calculated using pilot pairs with larger separation or lag, as shown in the FIG. 2b for $N_{sc}=12$. The conventional approach using TOE (see Equation 4) based on adjacent pilot pairs with lag 1 is demonstrated in FIG. 2a, while the new TOE approach according to the first embodiment using pilot pairs separated by 2 subcarriers with lag 2 is illustrated in FIG. 2b.

It can be shown that the TOE using pilot pairs with a larger subcarrier separation (e.g., for the lag >1) can provide a better receiver performance. For example, let us assume that the TOE is based on the phase difference of pilot pairs separated by L subcarriers (L>1), so that the TOE can be calculated as follows:

$$\tilde{\tau}_L = \frac{N}{2\pi L}(\angle P_{k-L} - \angle P_k) \qquad (5)$$
$$= \frac{N}{2\pi L}\angle(P_{k-L}P_k^*)$$
$$= \frac{N}{2\pi L}(\angle e^{j\frac{2\pi}{N}L\tau} + n'')$$
$$= \tau + \frac{N}{2\pi L}n'$$
$$= \tau + \frac{1}{L}\tilde{n}.$$

Figure 3:
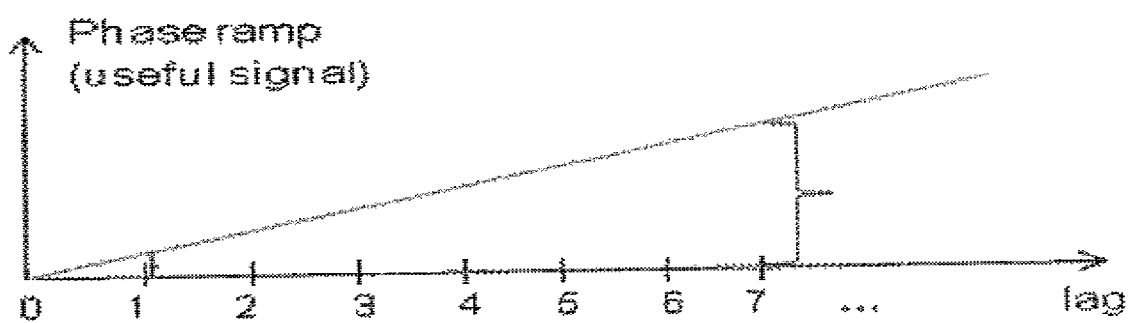
FIG. 3 is a diagram of a phase ramp (useful signal) vs. a length of lag according to an exemplary embodiment of the invention.

Compared with Equation 4 for $\tilde{\tau}_1$ above, we can see that the effective noise for $\tilde{\tau}_L$ is reduced by a factor of L. This implies that the TOE with a larger subcarrier separation will be more accurate due to a less effective noise or equivalently a larger effective SNR, as illustrated in FIG. 3, where the useful signal for the TOE is a phase ramp or a phase difference across subcarriers, which is a linear function of subcarrier index or the lag for pilot pairs. Clearly, the useful signal of the pilot pair with lag 7 is much stronger than that of the pilot pair with lag 1.

Moreover, intuitively, one may want to use pilot pairs with the largest possible lag for timing offset estimate to maximize the effective SNR per pilot pair. However, the number of pilot pairs would decrease as the lag increases for a given $N_{sc}$, which is the total number of subcarriers of the UE. This implies less benefits from averaging for the final TOE. Also, there is another restriction on the selection of lags. To avoid phase ambiguity in the TOE calculation, the lag L must satisfy the following condition:

$$-\pi < \frac{2\pi}{N}L\tau < \pi \qquad (6)$$

or $$-0.5N < L\tau < 0.5N.$$

For example for a 10 MHz system with N=1024, to support timing offset estimate up to 70 samples, the largest lag cannot be greater than 7.

Then, if a particular lag selection for the TOE is L=5, 6 and 7, the final TOE may be calculated as an average of all possible pilot pairs associated with $\tilde{\tau}_5$, $\tilde{\tau}_6$ and $\tilde{\tau}_7$ which are given by:

$$\tilde{\tau}_5 = \frac{1}{(N_{sc}-5)}\frac{N}{10\pi}\sum_{5 \le k \le N_{sc}-1}\angle(P_{k-5}P_k^*) \qquad (7a)$$

$$\tilde{\tau}_6 = \frac{1}{(N_{sc}-6)}\frac{N}{12\pi}\sum_{6 \le k \le N_{sc}-1}\angle(P_{k-6}P_k^*) \qquad (7b)$$

$$\tilde{\tau}_7 = \frac{1}{(N_{sc}-7)}\frac{N}{14\pi}\sum_{7 \le k \le N_{sc}-1}\angle(P_{k-7}P_k^*) \qquad (7c)$$

and then the average TOE can be determined as an average:

$$\tilde{\tau} = \frac{1}{3}(\tilde{\tau}_5 + \tilde{\tau}_6 + \tilde{\tau}_7), \qquad (8)$$

where $\tilde{\tau}$ is a final estimated timing offset.

According to the second embodiment described herein, the LTE UL timing offset estimate for a multi-UE case with CoMP and/or MIMO operation can be calculated as follows. In this scenario, multiple users may share the same radio resource or RBs. Consequently, received pilots can be represented as:

$$R_k = \sum_{u=1}^{M} g_u c_k(u) e^{-j2\pi\tau_u \frac{k}{N}} + n \qquad (9)$$

$$k = 0, 1, 2, \ldots, N_{sc}-1,$$

Where M is a number of users sharing the same radio resource, $g_u$ is a channel gain of kth subcarrier, $c_k(u)$ is a pilot on a subcarrier k of the user (UE) u, $\tau_u$ is a timing offset of the user u, $N_{sc}$ is a number of subcarriers of the PUSCH for the desired UE and n is a corresponding AWGN. The TOE for the desired user based on the method described above for a single UE can suffer a significant performance loss due to a strong interference among the multiple users.

In this case, it is essential to suppress the interference for the TOE calculation. By exploiting orthogonality of the LTE UL pilot sequences, especially for the UL MIMO and UL CoMP with coordinated pilot operation, we can virtually remove the multi-user interferences in the received DMRS. Without loss of generality, let user 1 be a desired UE. Then demodulated pilots of the user 1 may be determined by multiplying $R_k$ by conjugated pilot sequence of user 1, resulting (since $c_k(1)c^*_k(1)=1$) as follows:

$$P_k = R_k c_k^*(1) = g_1 e^{-j2\pi\tau_1 \frac{k}{N}} + \sum_{u=2}^{M} g_u c_k(u) c_k^*(1) e^{-j2\pi\tau_u \frac{k}{N}} + n', \qquad (10)$$

$$k = 0, 1, 2, \ldots, N_{sc}-1,$$

where $n'=c^*_k(1)n$. A set of new (modified group of) demodulated pilots, denoted by $P'_k$, may be calculated by sliding window average (or averaging window) on F. For a proper window size W, e.g., W=6 or 12, LTE UL pilot sequences may be designed so that $$\frac{1}{W}\sum_{w=1}^{W}c_{w+k}(u)c^*_{w+k}(v) = \begin{cases} 1 & u = v \\ 0 & u \ne v \end{cases} \qquad (11)$$

for the subcarrier index k such that $k+W \le N_{sc}-1$. Therefore, a group of new calculated pilots is less by W in length than the original received demodulated group of pilots. The new calculated pilots for the user 1 do not contain interference from other users. Then $P'_k$ can be calculated as follows ("0" indicates that there is no interference term and n'' is an average over W pilots):

$$P'_k = \frac{1}{W} \sum_{w=1}^{W} P_{k+w} = g_1 \frac{1}{W} \sum_{w=1}^{W} e^{-j2\pi\tau_1 \frac{k+w}{N}} + 0 + n'', \quad (12)$$

$$k = 0, 1, 2, \ldots, N_{sc} - W - 1$$

Figure 4:
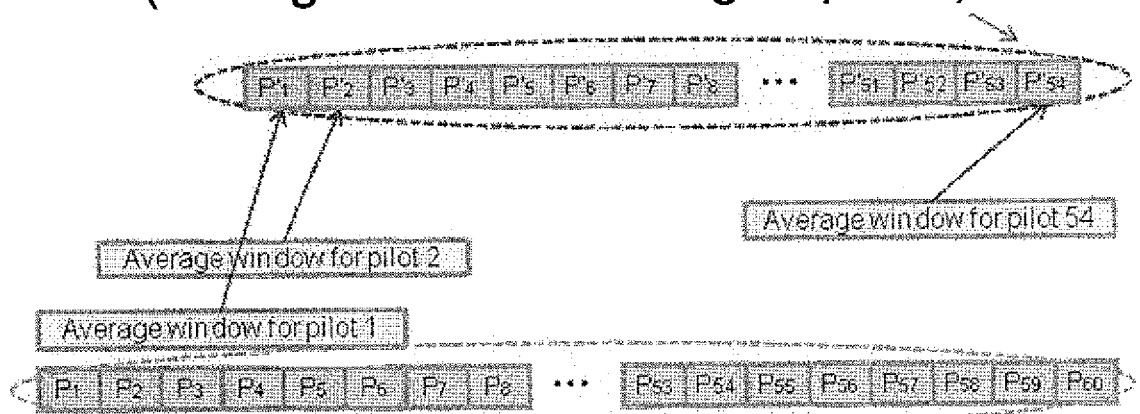
FIG. 4 is an diagram illustrating how the pilots are formed by a sliding an averaging window in case of 60 assigned pilots/subcarriers with a window size of 6 pilots/subcarriers according to exemplary embodiment of the invention.

FIG. 4 illustrates how the new pilots are formed by a sliding window average (averaging window) in case of 60 assigned subcarriers or equivalently 5 RBs and a window size of 6, where received 60 pilots are demodulated by the DMRS sequence of the desired user, then 6 of consecutive pilots are continuously selected and averaged to form a set of new modified pilots having 60-6=54 pilots/subcarriers in length. Then the TOE can be calculated using the new 54 pilots.

In the following, we will show how the TOE can be calculated using the new pilots. For simplicity and without loss of generality, we can write $$P'_k = \frac{1}{W} \sum_{w=1}^{W} P_{k+w} = \frac{1}{W} \sum_{w=1}^{W} e^{-j2\pi\tau \frac{k+w}{N}} + n \quad (13)$$

$$k = 0, 1, 2, \ldots, N_{sc} - W - 1,$$

where $\tau$ represents a TO of the desired user. Then the TOE can be calculated based on the phase difference between adjacent subcarriers of the new pilots (similar to Equation 4 for the first embodiment), as follows:

$$\tilde{\tau}_1 = \frac{N}{2\pi}(\angle P'_{k-1} - \angle P'_k) \quad (14)$$

$$= \frac{N}{2\pi}\left(\angle \frac{1}{W}\sum_{w=1}^{W} e^{-j2\pi\tau\frac{k-1+w}{N}} - \angle \frac{1}{W}\sum_{w=1}^{W} e^{-j2\pi\tau\frac{k+w}{N}}\right) + n'$$

$$= \frac{N}{2\pi}\frac{1}{W}\sum_{w=1}^{W} 2\pi\tau\left(\frac{k+w}{N} - \frac{k-1+w}{N}\right) + \frac{N}{2\pi}n'$$

$$= \tau \frac{1}{W}\sum_{w=1}^{W} 1 + \frac{N}{2\pi}n'$$

$$= \tau + \tilde{n},$$

where n' is a modified AWGN term. Similarly, we can calculate the TOE using pilot pairs with larger subcarrier separation, or lags, to reduce the effective noise, as described for the single UE according to the first embodiment, as follows:

$$\tilde{\tau}_L = \frac{N}{2\pi L}(\angle P'_{k-L} - \angle P'_k) \quad (15)$$

$$= \frac{N}{2\pi L}\left(\angle \frac{1}{W}\sum_{w=1}^{W} e^{-j2\pi\tau\frac{k-L+w}{N}} - \angle \frac{1}{W}\sum_{w=1}^{W} e^{-j2\pi\tau\frac{k+w}{N}}\right) + n'$$

$$= \frac{N}{2\pi L}\frac{1}{W}\sum_{w=1}^{W} 2\pi\tau\left(\frac{k+w}{N} - \frac{k-L+w}{N}\right) + \frac{N}{2\pi L}n'$$

$$= \tau \frac{1}{W}\sum_{w=1}^{W} 1 + \frac{N}{2\pi L}n'$$

$$= \tau + \frac{1}{L}\tilde{n}.$$

As for the single UE case described in the first embodiment, the effective noise is reduced by L times if one uses pilot pairs with large separation L. For example, in case of L=5, 6 and 7, the final TOE may be calculated as an average of all possible pilot pairs associated with $\tilde{\tau}_5$, $\tilde{\tau}_6$ and $\tilde{\tau}_7$ which are given by:

$$\tilde{\tau}_5 = \frac{1}{(N_{sc}-5)}\frac{N}{10\pi}\sum_{5 \leq k \leq N_{sc}-1} \angle(P'_{k-5}P'^*_k) \quad (16a)$$

$$\tilde{\tau}_6 = \frac{1}{(N_{sc}-6)}\frac{N}{12\pi}\sum_{6 \leq k \leq N_{sc}-1} \angle(P'_{k-6}P'^*_k) \quad (16b)$$

$$\tilde{\tau}_7 = \frac{1}{(N_{sc}-7)}\frac{N}{14\pi}\sum_{7 \leq k \leq N_{sc}-1} \angle(P'_{k-7}P'^*_k), \quad (16c)$$

and then the average TOE can be determined (as in the first embodiment, see Equation 8) as an average:

$$\tilde{\tau} = \frac{1}{3}(\tilde{\tau}_5 + \tilde{\tau}_6 + \tilde{\tau}_7). \quad (17)$$

Figure 5:
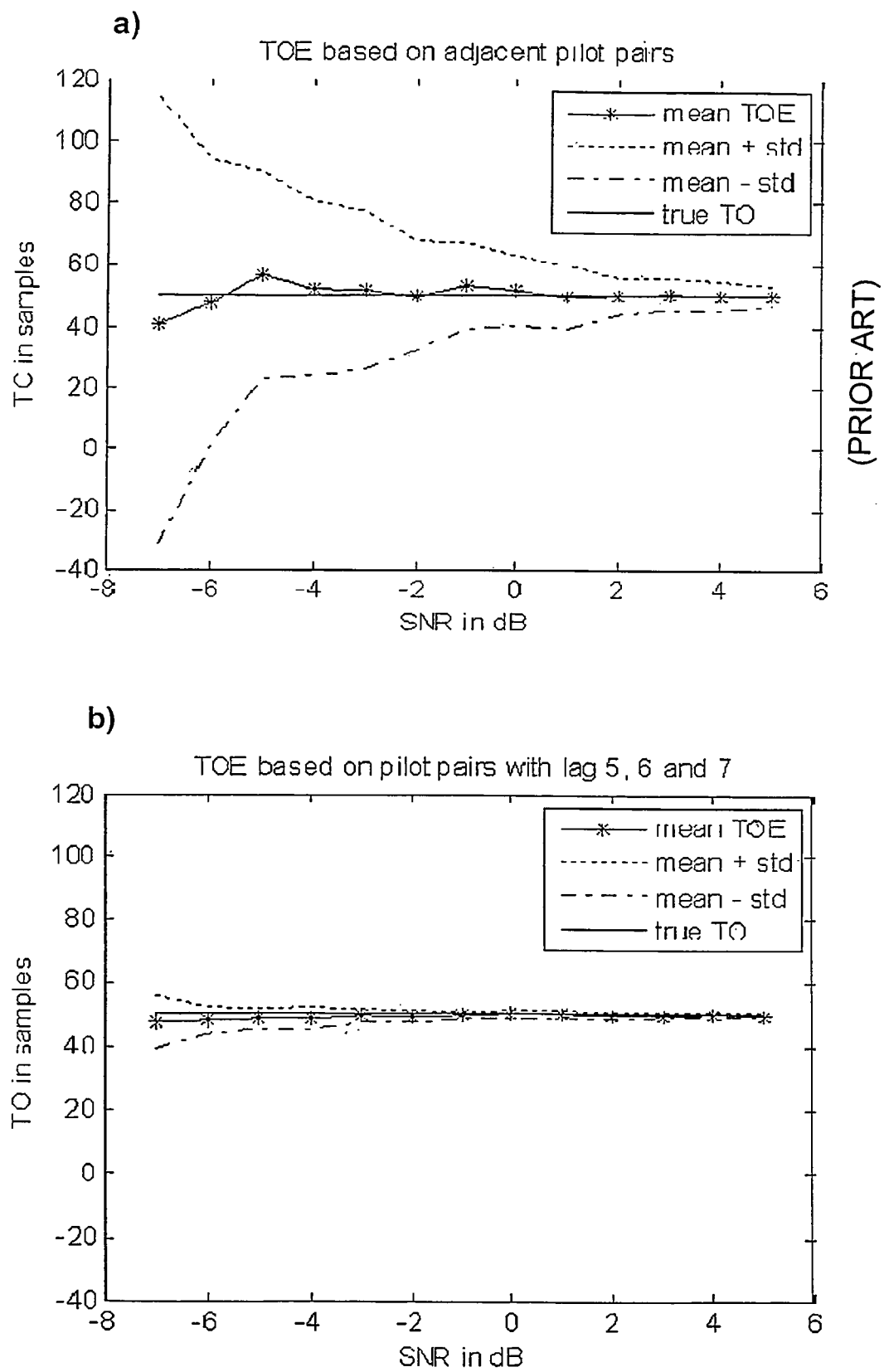
FIGS. 5a-5b and 6a-6b show TOE simulation results (TO samples vs. desired user SNR) for a first embodiment of the invention.

FIGS. 5a-5b and 6a-6b show TOE simulation results (TO samples vs. desired user SNR). FIG. 5a illustrates single UE TOE simulation results using a convention approach (using adjacent pilot pairs) and FIG. 5b illustrates single UE TOE simulation results using the new method for the first embodiment for lags 5, 6 and 7 in case of the AWGN channel. As expected, the new TOE method (as shown in FIG. 5b) outperforms conventional one (as shown in FIG. 5a) in terms of both mean value and estimate error variance. Note, that a solid line is an actual timing offset, a line with * represents a mean value of the estimated timing offset, dotted and dash-dotted lines indicate standard deviation of the estimated timing offset around a mean value, respectively.

Figure 6:
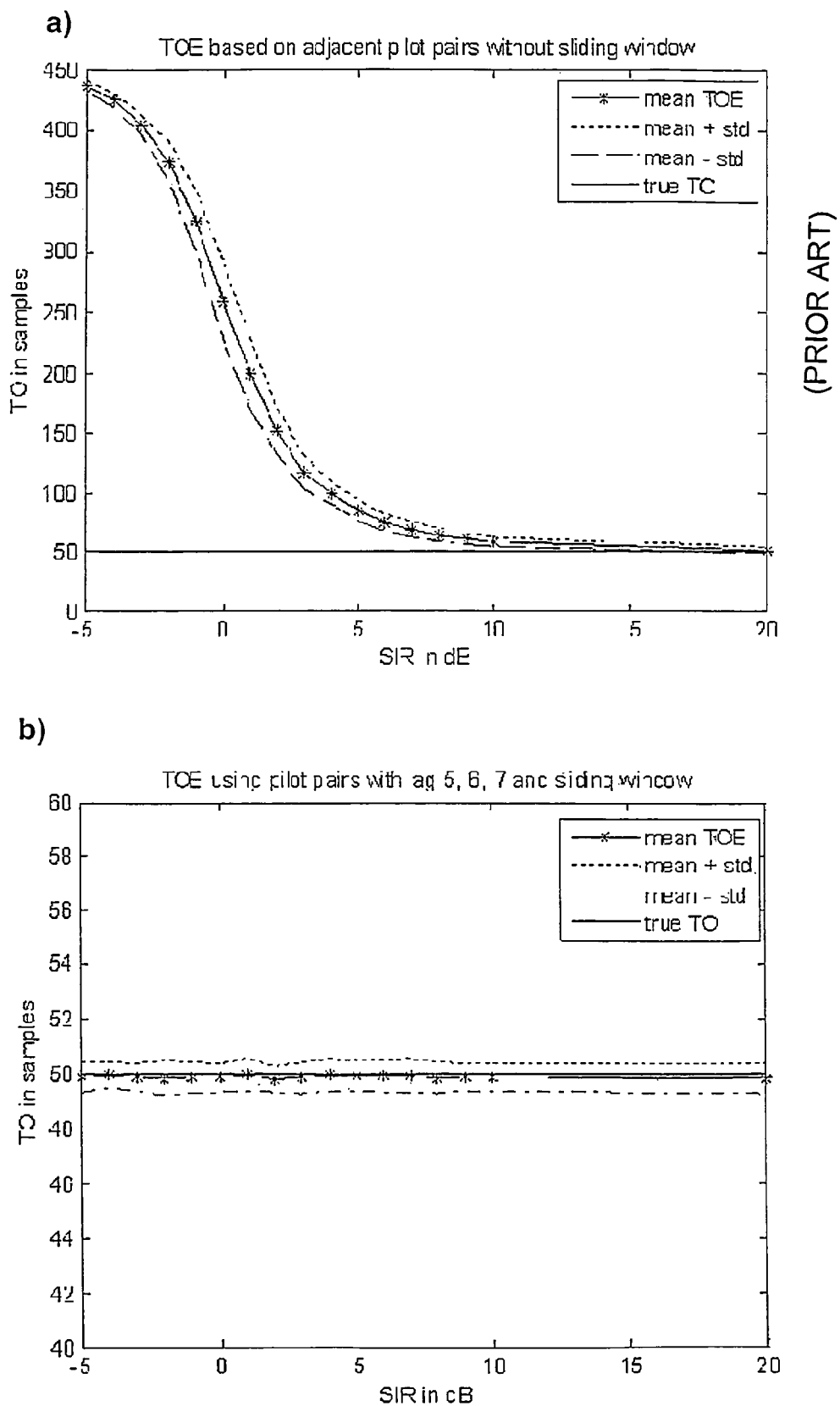

Furthermore, as demonstrated in FIGS. 6a-6b, in case of two users with MIMO or CoMP, the conventional method fails (as shown in FIG. 6a) while sliding window approach with lag 5, 6 and 7 works perfectly (as shown in FIG. 6b), where the interference is completely averaged out.

Figure 7:
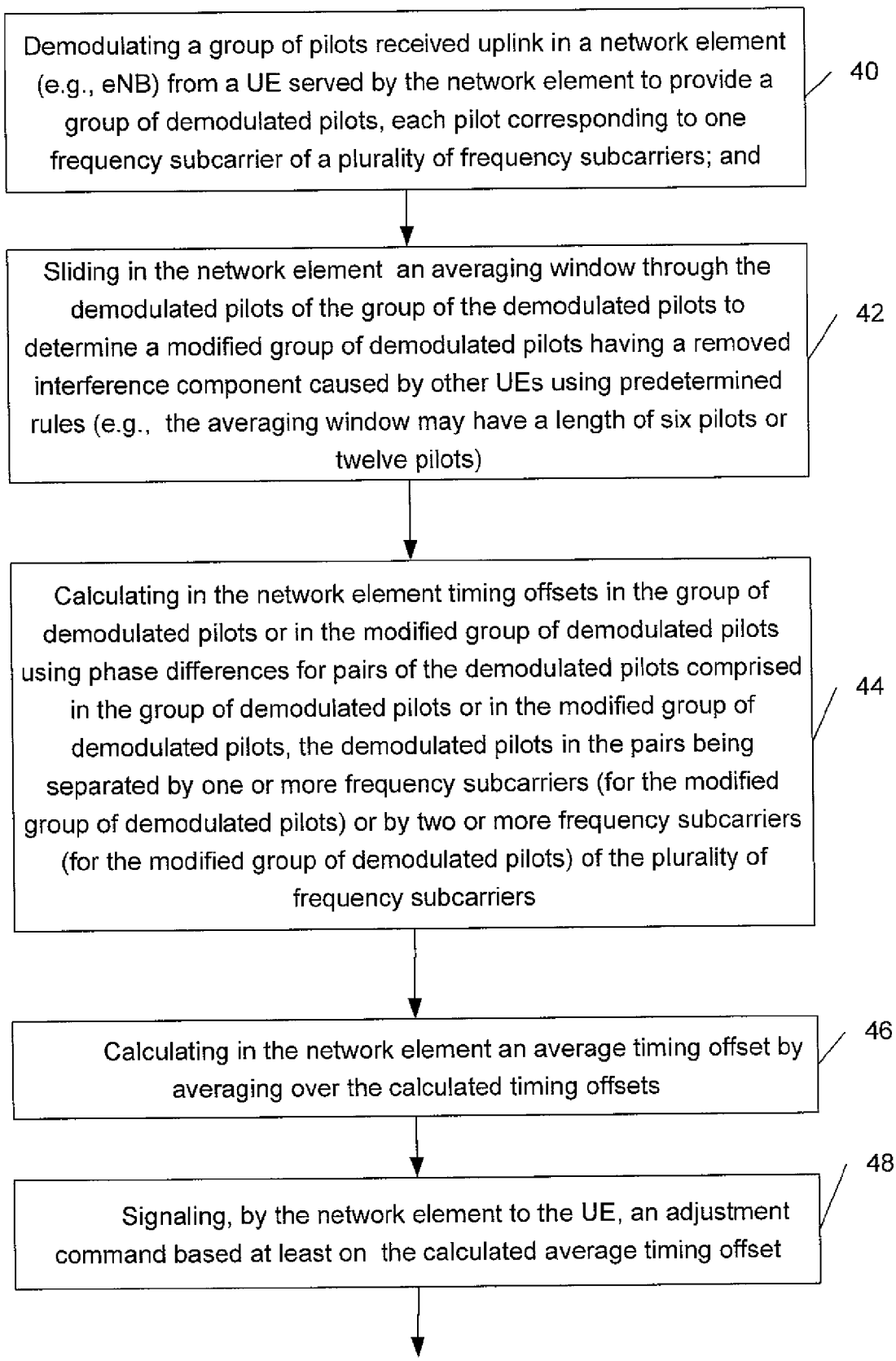
FIG. 7 is a flow chart demonstrating implementation of exemplary embodiments of the invention by an eNB.

FIG. 7 shows an exemplary flow chart demonstrating implementation of embodiments of the invention by a network element (e.g., eNB). It is noted that the order of steps shown in FIG. 7 is not absolutely required, so in principle, the various steps may be performed out of the illustrated order. Also certain steps may be skipped, different steps may be added or substituted, or selected steps or groups of steps may be performed in a separate application.

In a method according to the exemplary embodiment shown in FIG. 7, in a first step 40, the eNB (network element) demodulates a group of pilots received UL in a UE served by the eNB to provide a group of demodulated pilots, each pilot corresponding to one frequency subcarrier of a plurality of frequency subcarriers.

In a next step 42, the eNB performs sliding an averaging window through the demodulated pilots of the group of the demodulated pilots to determine a modified group of demodulated pilots having a removed interference component caused by other UEs using predetermined rules (e.g., the averaging window may have a length of six pilots or twelve pilots).

In a next step 44, the eNB calculates timing offsets in the group of demodulated pilots or in the modified group of demodulated pilots using phase differences for pairs of the demodulated pilots comprised in the group of demodulated pilots (according to the first embodiment if step 42 is not performed) or in the modified group of demodulated pilots (according to the second embodiment if step 42 is performed), the demodulated pilots in the pairs being separated by one or more frequency subcarriers (for the modified group of demodulated pilots) or by two or more frequency subcarriers (for the modified group of demodulated pilots) of the plurality of frequency subcarriers In a next step 46, the eNB calculates an average timing offset by averaging over the calculated timing offsets. In a next step 48, the eNB signals to the UE an adjustment command based at least on the calculated average timing offset.

Figure 8:
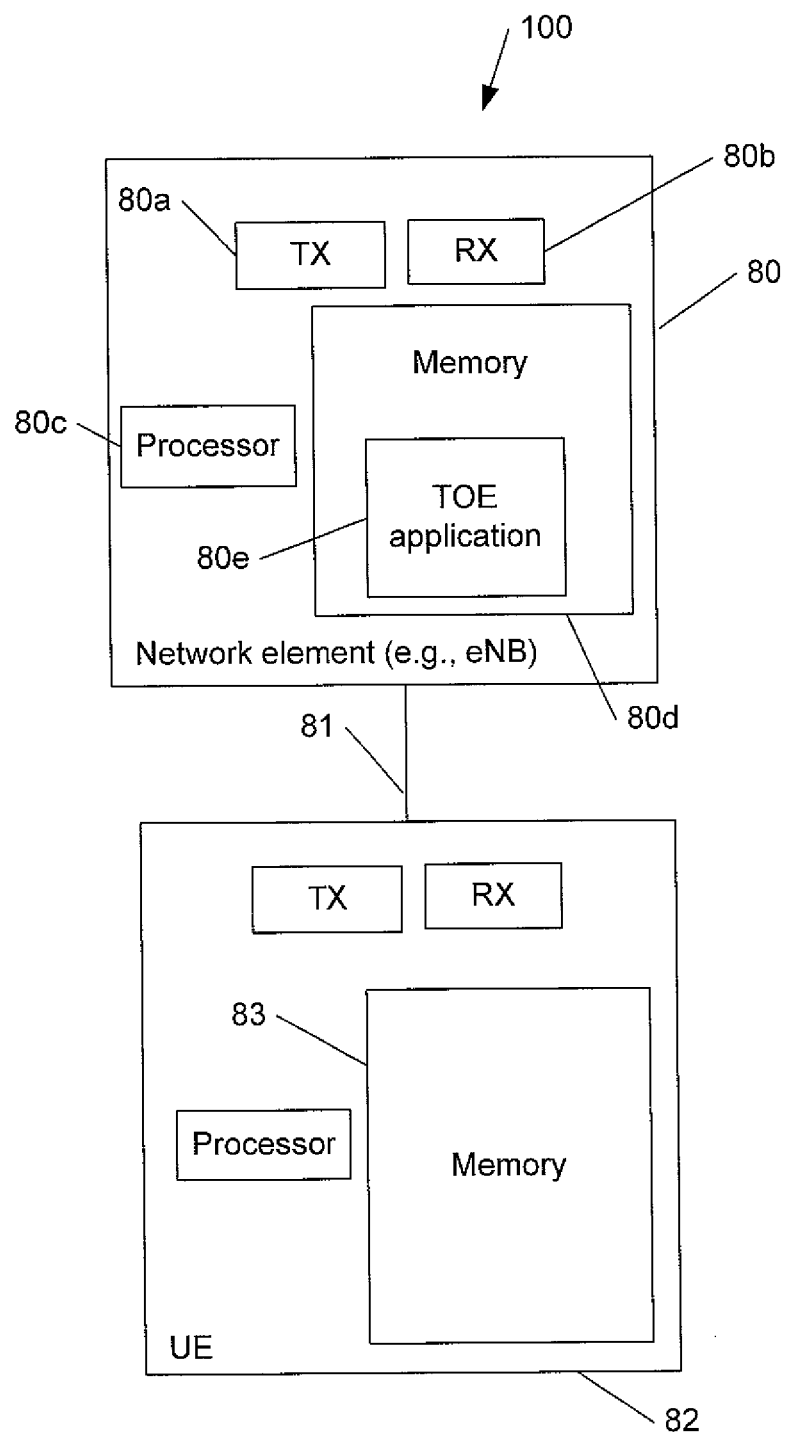
FIG. 8 is a block diagram of wireless devices for practicing exemplary embodiments of the invention.

FIG. 8 shows an example of a block diagram demonstrating wireless devices (e.g., in LTE) including a network element (e.g., eNB) 80 comprised in a network 100, and a UE 82 communicating with the eNB 80, according to an embodiment of the invention. FIG. 8 is a simplified block diagram of various electronic devices that are suitable for practicing the exemplary embodiments of this invention, and a specific manner in which components of an electronic device are configured to cause that electronic device to operate. The UE 82 may be a mobile phone, a camera mobile phone, a wireless video phone, a portable device or a wireless computer, etc.

The eNB 80 may comprise, e.g., at least one transmitter 80a, at least one receiver 80b, at least one processor 80c at least one memory 80d and a TOE application module 80e. The transmitter 80a and the receiver 80b may be configured to provide a wireless communication with the UE 82 (and others not shown in FIG. 8), e.g., through a corresponding link 81, according to the embodiments of the invention. The transmitter 80a and the receiver 80b may be generally means for transmitting/receiving and may be implemented as a transceiver, or a structural equivalence thereof. It is further noted that the same requirements and considerations are applied to transmitter and receiver of the UE 82.

Various embodiments of the at least one memory 80d (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 80c include but are not limited to general purpose computers, special purpose computers, microprocessors, digital signal processors (DSPs) and multi-core processors. Similar embodiments are applicable to memories and processors in other wireless devices such as UE 82 shown in FIG. 8.

The TOE application module 80e may provide various instructions for performing steps 40-48 shown in FIG. 7 (according to the first or second embodiments described herein). The module 80e may be implemented as an application computer program stored in the memory 80d, but in general it may be implemented as software, firmware and/or hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor. Furthermore, the module 80e may be implemented as a separate block or may be combined with any other module/block of the device 80, or it may be split into several blocks according to their functionality.

The UE 82 may have similar components as the eNB 80, as shown in FIG. 8, so that the above discussion about components of the eNB 80 is fully applicable to the components of the UE 82.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. The method, comprising:

demodulating a group of pilots, received in uplink in a network element from a user equipment served by the network element, to provide a group of demodulated pilots, each pilot corresponding to one frequency subcarrier of a plurality of frequency subcarriers; and sliding in the network element an averaging window through the demodulated pilots of the group of the demodulated pilots to determine, using predetermined rules a modified group of demodulated pilots having a removed interference component caused by other user equipments, the averaging window having a length comprising multiple pilots; and calculating in the network element timing offsets in the demodulated group of pilots using phase differences for pairs of the demodulated pilots comprised in the modified group of demodulated pilots, the demodulated pilots in the pairs being separated by one or more frequency subcarriers of the plurality of frequency subcarriers.

2. The method of claim 1, further comprising:

calculating in the network element an average timing offset by averaging over the calculated timing offsets; and signaling, by the network element to the user equipment, an adjustment command based at least on the calculated average timing offset.

3. The method of claim 1, wherein the demodulated pilots in the pairs being separated by two or more frequency subcarriers.

4. The method of claim 1, wherein the demodulated pilots in the corresponding pairs being separated by five, six or seven frequency subcarriers of the plurality of frequency subcarriers.

5. An apparatus comprising:

at least one processor and a memory storing a set of computer instructions, in which the processor and the memory storing the computer instructions are configured to cause the apparatus to:

demodulate a group of pilots received in uplink by the apparatus from a user equipment served by the network element, to provide a group of demodulated pilots, each pilot corresponding to one frequency subcarrier of a plurality of frequency subcarriers; and slide an averaging window through the demodulated pilots of the group of the demodulated pilots to determine, using predetermined rules, a modified group of demodulated pilots having a removed interference component caused by other user equipments, the average window having a length comprising multiple pilots, wherein the computer instructions are configured to cause the apparatus to calculate timing offsets in the demodulated group of pilots using phase difference for pairs of the demodulated pilots comprised in the modified group of demodulated pilots, the demodulated pilots in the pairs being separated by one or more frequency subcarriers of the plurality of frequency subcarriers.

6. The apparatus of claim 5, wherein the computer instructions are configured to cause the apparatus to:

calculate an average timing offset by averaging over the calculated timing offsets; and signal to the user equipment an adjustment command based at least on the calculated average timing offset.

7. The apparatus of claim 5, wherein the demodulated pilots in the pairs being separated by two or more frequency subcarriers.

8. The apparatus of claim 5, wherein the averaging window has a length of six pilots or twelve pilots.

9. The apparatus of claim 5, wherein the apparatus is engaged in a multiple-user multiple input multiple output operation or in a coordinated multiple point operation where the user equipment share at least one common radio resource with the other user equipments, so that the other user equipments create the interference component in the demodulated pilots which is removed using said sliding of the averaging window.

10. The apparatus of claim 5, wherein the sliding of the averaging window is based on coordinated pilot orthogonality.

11. The apparatus of claim 5, wherein the apparatus comprises an eNB.

12. A computer program product comprising a non-transitory computer readable medium bearing computer program code embodied herein for use with a computer, the computer program code comprising:

code for demodulating, in a network elements, a group of pilots received via a plurality of frequency subcarriers in uplink from user equipment served by the network element to provide a group of demodulated pilots, each pilot corresponding to a respective frequency subcarrier to the plurality of frequency subcarriers;

code for demodulating, in a network element, a group of pilots received via a plurality of frequency subcarriers in uplink from a user equipment served by the network element to provide a group of demodulated pilots, each pilot corresponding to a respective frequency subcarrier of the plurality of frequency subcarriers;

code for removing, in the network element, at least one interference component caused by other user equipment from the group of demodulated pilots, at least by sliding an averaging window through the demodulated pilots of the group of the demodulated pilots to determine a modified group of demodulated pilots that does not include the at least one removed interference component, the averaging window having a length comprising multiple pilots; and code for a calculation, in the network element, timing offsets in the demodulated group of pilots using phase differences for pairs of the demodulated pilots comprised in the modified group of demodulated pilots, the demodulated pilots in the pairs being separated by one or more frequency subcarriers of the plurality of frequency subcarriers.

13. A method comprising:

demodulating, in a network element, a group of pilots received via a plurality of frequency subcarriers in uplink from a user equipment served by the network element to provide a group of demodulated pilots, each pilot corresponding to a respective frequency subcarrier of the plurality of frequency subcarriers;

removing, in the network element, at least one interference component caused by other user equipments from the group of demodulated pilots, at least by sliding an averaging window through the demodulated pilots of the group of the demodulated pilots to determine a modified group of demodulated pilots that does not include the at least one removed interference component, the averaging window having a length comprising multiple pilots; and calculating, in the network elements, timing offsets in the demodulated group of pilots using phase differences for pairs of the demodulated pilots comprised in the modified group of demodulated pilots, the demodulated pilots in the pairs being separated by one or more frequency subcarriers of the plurality of frequency subcarriers.

14. The method of claim 13, wherein a noise component in the timing offset is inversely proportional a lag equals to a number of the two or more frequency subcarriers separating demodulated pilots in the pairs of the demodulated pilots.

15. The method of claim 13, wherein the averaging window has a length of six pilots or twelve pilots.

16. The method of claim 13, wherein the network element is engaged in a multiple-user multiple input multiple output operation or in a coordinated multiple point operation where the user equipment share at least one common radio resource with the other user equipments, so that the other user equipments create the interference component in the demodulated pilots which is removed using said sliding of the averaging window.

17. The method of claim 13, wherein the modified groups of demodulated pilots comprises less pilots that the group of demodulated pilots by a number of pilots having a total duration equals to a duration of the averaging window.

18. The method of claim 13, wherein the sliding of the averaging window is based on coordinated pilot orthogonality.

19. The method of claim 13, wherein the network element comprises an eNB.

* * * * *

UNITED STATES PATENT AND TRADEMARK OFFICE
CERTIFICATE OF CORRECTION

PATENT NO. : 9,001,812 B2  
APPLICATION NO. : 13/719385  
DATED : April 7, 2015  
INVENTOR(S) : Yu et al.

Page 1 of 1

It is certified that error appears in the above-identified patent and that said Letters Patent is hereby corrected as shown below:

In the Claims

Claim 1, col. 12, line 22 "The" should be deleted and --A-- should be inserted.

Claim 5, col. 13, line 1 "average" should be deleted and --averaging-- should be inserted.

Claim 5, col. 13, line 5 "difference" should be deleted and --differences-- should be inserted.

Claim 12, col. 13, line 38 "code for demodulating a group of pilots received uplink in a network element from a user equipment served by the network element to provide a group of demodulated pilots, each pilot corresponding to one frequency subcarrier of a plurality of frequency subcarriers" should be deleted.

Claim 12, col. 14, line 4 "calculation" should be deleted and --calculating-- should be inserted.

Claim 17, col. 14, line 47 "groups" should be deleted and --group-- should be inserted.

Claim 17, col. 14, line 48 "that" should be deleted and --than-- should be inserted.

Signed and Sealed this  
Twenty-third Day of June, 2015

Michelle K. Lee  
*Director of the United States Patent and Trademark Office*